Patented Nov. 25, 1941

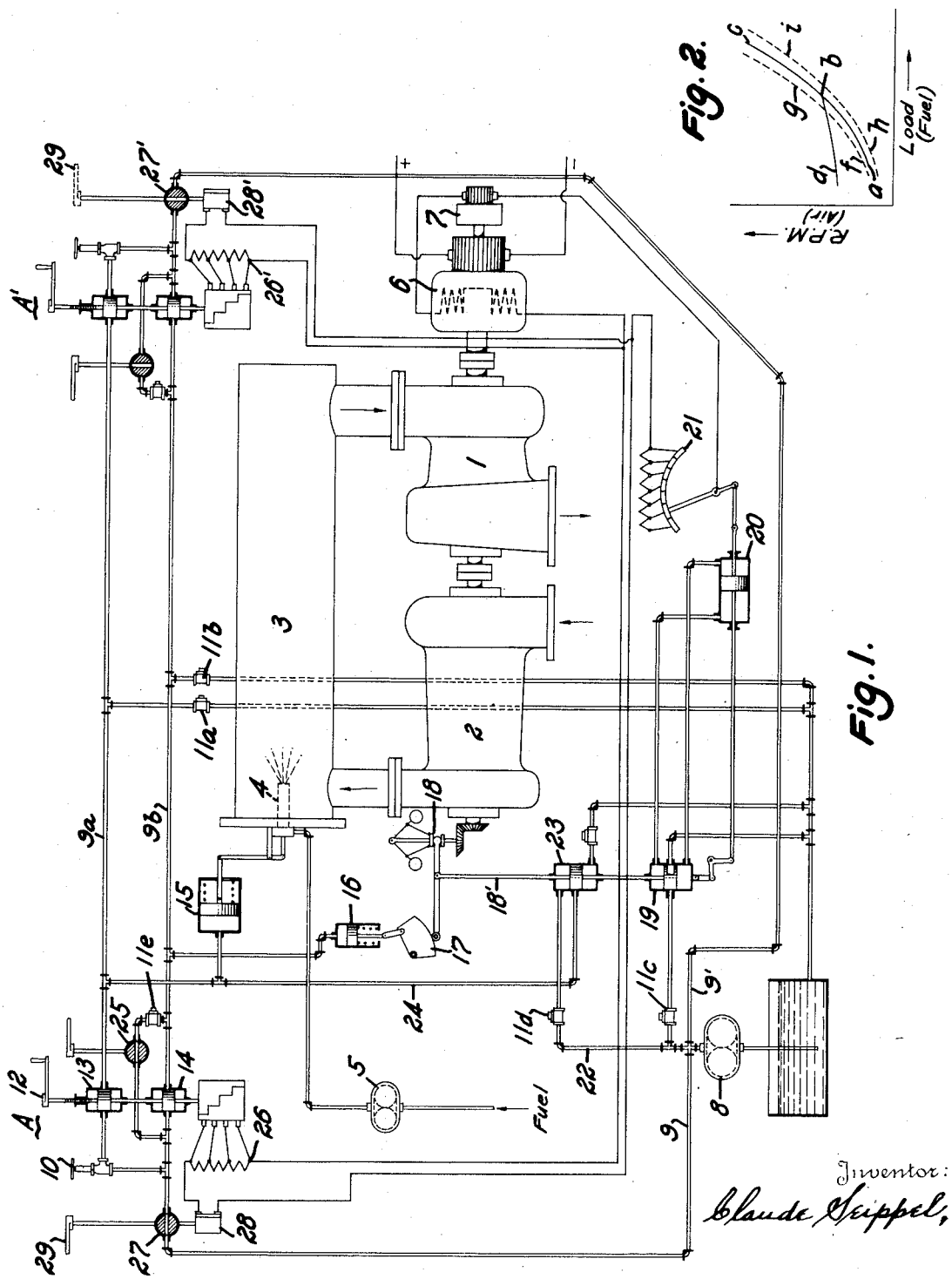

2,263,705

UNITED STATES PATENT OFFICE 2,263,705

GAS TURBINE PLANT

Claude Seippel, Ennetbaden, Switzerland, assignor to Aktiengesellschaft Brown, Boveri & Cie, Baden, Switzerland, a joint-stock company Application March 22, 1941, Serial No. 384,753
In Switzerland January 15, 1940

10 Claims. (Cl. 290—2)

This invention relates to gas turbine plants and particularly to variable speed gas turbo-electric plants in which the gas turbine also drives the compressor system that supplies air and/or fuel gas to the combustion chamber.

The power developed by a variable speed combustion gas turbine plant may be varied by regulation of the fuel supply but the highest efficiency is obtained when the compressor unit is operated at its best efficiency under the varying load conditions. For each load condition, or rate of fuel supply, there is a definite compressor speed that affords most efficient operation. The turbine plant speed may be adjusted, as described in my prior Patent No. 2,193,114, granted March 12, 1940, by regulation of the field excitation of the current generator (which is the ultimate load carried by the turbine plant) to supply the combustion air at best efficiency.

It may be desirable, however, to depart from operation at maximum efficiency to meet special operating conditions that may be of a temporary or relatively long nature. It may be necessary, for example in the case of a turbo-electric plant of a locomotive or a ship, to subordinate efficiency to power output for acceleration, or it may be advisable to depart from the regulation corresponding to maximum efficiency under normal conditions when there is a marked change in the characteristics of the fuel, the inlet air temperature, or other operating conditions.

An object of the present invention is to provide a combustion turbine plant for driving an electric generator that carries a variable load; the plant including automatic regulating mechanism for varying the fuel supply and the rotary speed of the plant in accordance with varying load conditions, and manually adjustable devices for modifying the operation of the automatic mechanism to meet special operating conditions. An object is to provide a combustion turbine of the stated type in which the regulating forces and movements are transmitted by a hydraulic or oil pressure system. An object is to provide a variable speed electro-turbine system having a regulating system with two manual control stations that are to be used alternatively, a locking device at each control station for rendering the same inoperative, and a single control member for the locking devices, the control member being removable from the locking devices only when the latter are adjusted to render the associated control station inoperative.

These and other objects and advantages of the invention will be apparent from the following specification when taken with the accompanying drawing in which:

Fig. 1 is a diagrammatic view illustrating a variable speed electro-turbine plant embodying the invention; and Fig. 2 is a curve sheet showing the operating characteristics of the turbine plant for different adjustments of the manually operable control members.

The illustrated turbine plant includes a regulation system of the general type shown in Fig. 3 of my prior patent, i. e. the field excitation of the generator unit is controlled by a speed governor which in turn is adjusted in accordance with the fuel supply to the combustion chamber. A hydraulic transmission for the regulating forces is illustrated but it is to be understood that electrical or mechanical transmissions may be employed.

The turbine plant includes the gas turbine 1, the compressor 2 for supplying combustion air to the combustion chamber 3, which has an oil burner 4 fed from a supply pump 5, the main generator 6 which delivers current to motors, not shown, and a small generator 7 which supplies the field excitation current for the main generator.

The hydraulic control system for regulating the air supply and the generator field excitation as a function of the rate of fuel supply includes a pump 8 for forcing oil under pressure through pipes 9, 9' that extend to duplicate control stations A, A' at opposite ends of the electric locomotive that is to be driven by the illustrated turbine plant. The adjustable control members are duplicated at the two control stations and the elements at station A' are identified by primed reference numbers but will not be described in detail.

Pipe 9 of the control system opens into the branch pipe 9a, 9b at the control station A, and a hand-actuated pressure-regulating valve 10 is inserted in the pipe 9a adjacent the junction of the branch pipes. Fixed orifices 11a, 11b, respectively, are inserted in the return lines from pipes 9a, 9b, to the sump of the oil circulating pump 8 to establish a predetermined distribution of the circulating oil to the branch pipes 9a, 9b under normal operating conditions, i. e. when the valve 10 is adjusted for normal operation. The main control lever 12 actuates throttling plungers or slide valves 13, 14 in the pipes 9a, 9b to regulate the oil pressures established at the power piston 15 that controls the rate of fuel supply to the burner 4 and at the power piston 16 that adjusts a pivoted cam plate 17 of the speed governor system. The cam plate 17 provides a movable pivot point for the relatively fixed end of the lever of the governor 18 that is driven from the turbine shaft. The governor rod 18' carries a plunger or slide valve 19 for regulating the flow of pressure oil to the power piston 20 that adjusts a series resistance 21 in the field excitation circuit of the power generator 6. Pump 8 delivers pressure oil to the cylinder of plunger 19 through pipe 22 and a fixed orifice 11c, and the cylinder of a second governor-actuated plunger 23 receives pressure oil from pipe 22 through a fixed orifice 11d. The control plunger 23 blocks flow through oil pipe 24 when the turbine plant is operating under normal conditions at any given loading, but the plunger is displaced by movement of the governor rod 18 to connect the oil pipe 24 to the oil pressure line 23 or to the oil return pipe. The oil pipe 24 extends to the power piston 15 that regulates the fuel supply to the burner 4, and a control action of the plunger 23 therefore affects the rate of fuel supply independently of the control action of control plunger 13 that is adjusted manually by the main handle 12.

The regulating plunger 23 serves to accelerate the establishment of stable operating conditions upon a sudden change in the load or in the setting of the main control handle 12. This modification of the fuel supply and compressor speed relation (as determined by pressures established at power pistons 15 and 16 through pipes 9a, 9b respectively) may increase the temperatures in the gas turbine to values that would not be permissible for continuous operation, but the temperatures drop quickly to normal values when the turbine plant speed reaches the new value corresponding to the changed operating conditions.

An additional manual control of the relative pressures in oil pipes 9a, 9b is provided by an adjustable valve 25 in a bypass around the control plunger 14. A fixed orifice 11e is preferably included in the bypass to limit the control range of the valve 25.

Stable operation at small loads, and a smooth acceleration in speeding up from small loads are provided by the resistance 26 that is in series with the governor-controlled resistance 21. The resistance 26 is adjusted by the main control handle 12, and is effective to weaken the generator field only when the control handle 12 is set for idling or small loads.

In turbine plants or locomotives or other systems having duplicate control stations, it must be possible to operate from either station but the other station should be locked against operation. This condition is satisfied by cut-off valves 27, 27' in the pressure pipes 9, 9', at control stations A and A', respectively, and switches 28, 28' operable simultaneously with valves 27, 27' to open the circuits of the associated resistances 26, 26' when the valves are closed. A single control handle 29 is provided for operating the valves 27, 27', and the handle is so designed that it can be removed from a valve stem only when the valve is closed. The turbine plant can idle for a short period as the operator moves from one control station to the other, but the plant will not operate under load while both cut-off valves 27, 27' are closed and the field excitation circuit is open at switches 28, 28'.

The different types of regulation that may be obtained with the described construction are indicated by the curves of Fig. 2, in which the abscissae represent the load or power output (which varies approximately with the fuel supply) and the ordinates represent the speed of the turbine plant or the quantity of air delivered under the most favorable conditions. For normal operation, the pressure regulating valve 10 is set at an indicated normal position and the bypass valve 25 is closed. The power output is regulated by the control handle 12 which adjusts the plungers 13, 14, and thereby varies the oil pressures established at power piston 15, which regulates the fuel supply, and at power piston 16, which adjusts the cam plate 17 of the governor mechanism. The contour of the cam plate 17 is determined experimentally to establish the particular compressor speed, for each rate of fuel supply, at which the combustion air is supplied at maximum efficiency. This regulation of the compressor speed is obtained through the governor-actuated plunger 19 that controls the piston 20 and thereby the effective value of the resistance 21. The turbine plant has an operating characteristic such as indicated by the solid line curve $abc$ under normal operating conditions.

The control valve 25 may be opened to a greater or lesser extent to insure stable operation when the turbine plant is idling and to provide a smooth acceleration under load, for example in starting a train. The opening of control valve 25 increases the pressure in the pipe 9b, and thereby moves the power piston 16 to a point beyond that corresponding to the flow of pressure oil through the regulating plunger 14. The cam plate 17 is rocked to set the governor 18 for a control action at a higher turbine speed than that determined by the adjustment of the main control handle 12. The fuel supply is automatically increased to maintain the higher turbine speed as the governor 18 shifts the plunger 23 to admit pressure oil to the fuel-regulating piston 15 through the pipe 24. The operating characteristics of the turbine plant for this adjustment of valve 25 are indicated by the solid line curve $dbc$. It will be noted that the opening of the valve 25 affects the operating characteristic only over the lower end of the load range since the fixed orifice 11e limits the quantity of pressure oil that may flow through the bypass around the control plunger 14.

The control action of the regulating plunger 23 is indicated by the broken line curves $fg$ and $hi$, respectively. The plunger 23 has little or no effect upon the operating characteristics so long as there is no abrupt change in the rate of fuel supply or in the load. When either the fuel supply or the load changes so rapidly that the turbine speed departs momentarily from the value appropriate for the efficient supply of the combustion air, the regulating plunger 23 becomes operative to accelerate the adjustment of the turbine speed to a new value. In the case of a sudden increase in the load, the regulating plunger 23 opens the pipe 24 to the pressure line 22 and the fuel supply is increased. The operating characteristic is thereby shifted momentarily from the curve $abc$ to the curve $hi$. In the case of a sharp decrease in the load or in the rate of fuel supply, the regulating plunger 23 opens the pipe 24 to the oil return line and thereby decreases the fuel supply momentarily. This corresponds to a temporary shift from the operating characteristic $abc$ to the characteristic $fg$.

The operating characteristic of the turbine plant may be shifted for longer periods by adjustment of the pressure regulating valve 10 when the relation between fuel supply and turbine speed should be altered to meet some relatively permanent condition such as a change in the fuel or a change in the air intake temperature. The valve 10 may be adjusted in either sense to increase the relative quantity of fuel, curve $hi$, or to decrease the relative quantity of fuel, curve $fg$.

It is to be understood that the invention is not limited to the particular embodiment herein shown and described, and that various changes may be made without departing from the spirit of my invention as set forth in the following claims.

I claim:

1. In a variable-speed combustion turbine plant, the combination with a turbine, a combustion chamber for producing pressure gas for operation of the turbine, a fuel inlet for said chamber, a compressor connected to and driven by said turbine to supply combustion air to said chamber, an electrical generator driven by said turbine, and means for adjusting the rate of fuel supply to said chamber, of speed-regulating means normally operative to vary the field excitation of said generator with changes in the fuel supply to establish for each rate of fuel supply a turbine plant speed at which the required amount of combustion air is supplied to the combustion chamber at high compressor efficiency, and means adjustable to alter temporarily the fuel supply-turbine speed relationship normally established by said speed-regulating means.

2. In a variable speed combustion turbine plant, the invention as recited in claim 1, wherein said speed-regulating means and said means for adjusting the rate of fuel supply each include an adjustable control member, said control members being connected to a manually operable member for simultaneous adjustment, and said adjustable means comprises an additional control member manually adjustable to modify the control action of one of said adjustable control members.

3. In a variable speed combustion turbine plant, the invention as recited in claim 1, wherein said adjustable means comprises means operable by a sudden departure of the turbine speed from the normal value corresponding to the rate of fuel supply at that time to alter the rate of fuel supply in that sense which accelerates the re-establishment of the normal fuel supply-turbine speed relationship.

4. A control system for a variable speed gas turbo-electric plant of the type including a gas turbine, a combustion chamber for producing operating gas for said turbine, an air compressor connected to and operated by said turbine to supply combustion air to said chamber, fuel supply means connected to said chamber, and an electric generator connected to and operated by said turbine to develop electric power; said control system comprising a pump for circulating a pressure fluid through two pressure pipes, means responsive to the pressure in one pipe for varying the rate of fuel supply to said combustion chamber, means responsive to pressure in the other pipe to vary the field excitation of the generator and thereby the turbine speed, manually operable control means for adjusting simultaneously the rates of flow of pressure fluid through the respective pressure pipes, and regulating means operable independently of said control means to alter the pressure established in one of said pipes, thereby to alter the fuel supply-turbine speed characteristic normally established through adjustment of said control means.

5. A control system as claimed in claim 4, wherein said control means includes valves in the respective pressure pipes, and said regulating means comprises a bypass around the valve in said other pipe, and a manually adjustable valve in said bypass.

6. A control system as claimed in claim 4, wherein said control means includes valves in the respective pressure pipes, and said regulating means comprises a bypass around the valve in said other pipe, a manually adjustable valve in said bypass, and a fixed orifice in said bypass to limit the control action of said manually adjustable valve to the lower portion of the range of turbine speeds.

7. A control system as claimed in claim 4, wherein said regulating means comprises a manually adjustable pressure regulating valve in the pressure pipe associated with said means for varying the rate of fuel supply.

8. A control system as claimed in claim 4, wherein said regulating means comprises an additional pressure pipe connected to said means for varying the rate of fuel supply, valve means for connecting said additional pipe to said pump or to a vent pipe, and a governor responsive to turbine speed for operating said valve means, said valve means being normally closed when the turbine speed corresponds approximately to the value determined by the adjustment of said control means.

9. In a variable speed gas turbo-electric plant, a gas turbine, a combustion chamber for generating pressure gas to operate said turbine, a variable fuel supply for said chamber, a compressor operated by said turbine to supply combustion air to said chamber, an electric generator driven by said turbine, said generator having a field excitation circuit including an adjustable resistance, adjustable control means for varying the rate of fuel supply to said combustion chamber, means responsive to a change in the rate of fuel supply to adjust said resistance to establish a turbine speed at which said compressor delivers the required amount of combustion air to said chamber at high compressor efficiency, and means for stabilizing the operation of said turbine at low generator loadings; said stabilizing means comprising a second adjustable resistance in said field excitation circuit, and means operable by said control means when adjusted for low generator loadings to vary the effective value of said second resistance.

10. A control system for a variable speed gas turbo-electric plant of the type including a turbine operating a compressor for supplying combustion air to a combustion chamber, an adjustable fuel supply to said chamber, a generator driven by said turbine and having a field excitation circuit including an adjustable resistance; said control system including pressure-responsive means for regulating the flow of fuel to said chamber, pressure-responsive means for regulating said resistance and thereby the speed of the turbine, a pump for supplying oil under pressure to said pressure-responsive means through alternative pressure pipe systems, adjustable control means in each pressure pipe system, cut-off valves for rendering each pipe system inoperative, and a single member for operating both cut-off valves, said member being removable from either valve only when that valve is in closed position.

CLAUDE SEIPPEL.